(12) United States Patent
Yoshida et al.

(10) Patent No.: US 7,444,887 B2
(45) Date of Patent: Nov. 4, 2008

(54) TOUCH SENSOR USING OPTICAL FIBER

(75) Inventors: Takashi Yoshida, Yamatokoriyama (JP);
Hiroyuki Kajimoto, Tokyo (JP)

(73) Assignee: Nitta Corporation, Osaka-Shi, Osaka (JP)

( * ) Notice: Subject to any disclaimer, the term of this patent is extended or adjusted under 35 U.S.C. 154(b) by 0 days.

(21) Appl. No.: 11/881,832

(22) Filed: Jul. 27, 2007

(65) Prior Publication Data
US 2008/0047364 A1 Feb. 28, 2008

(30) Foreign Application Priority Data
Jul. 28, 2006 (JP) ............................. 2006-205960

(51) Int. Cl.
*G01D 7/00* (2006.01)
(52) U.S. Cl. ................................. 73/862.041
(58) Field of Classification Search ............ 73/862.041, 73/862.043; 340/712; 702/189; 345/173
See application file for complete search history.

(56) References Cited

U.S. PATENT DOCUMENTS

| | | | |
|---|---|---|---|
| 4,812,833 A * | 3/1989 | Shimauchi | ................ 345/175 |
| 5,335,557 A * | 8/1994 | Yasutake | ................ 73/862.043 |
| 6,990,435 B2 * | 1/2006 | Kaneko et al. | ............... 702/189 |
| 2004/0027339 A1 * | 2/2004 | Schulz | ....................... 345/173 |
| 2006/0096392 A1 * | 5/2006 | Inkster et al. | .......... 73/862.041 |
| 2007/0285406 A1 * | 12/2007 | Kukulj et al. | ............... 345/176 |
| 2008/0029691 A1 * | 2/2008 | Han | .......................... 250/224 |

FOREIGN PATENT DOCUMENTS

JP 2002-507279 3/2002

OTHER PUBLICATIONS esp@cenet patent abstract for International Publication No. WO 99/04234, Publication date Jan. 28, 1999 (1 page).

* cited by examiner

*Primary Examiner*—Jewel V Thompson
(74) *Attorney, Agent, or Firm*—Osha Liang LLP

(57) ABSTRACT

In a touch sensor, one ends of optical fibers are disposed at positions corresponding to respective pressure sensing points on a sensor sheet. The optical fibers in a bundled form are connected in a detection unit. The detection unit includes therein a camera that takes an image showing a change in luminance at the other ends of the optical fibers. A transmissive body is disposed to contain the other ends of the optical fibers and light sources. Upper and side faces of the transmissive body are covered with antireflection members. The transmissive body has substantially the same refractive index as the core of each optical fiber. A force applied to the sensor sheet is detected based on the change in luminance at the other ends of the optical fibers shown in the image taken by the camera.

2 Claims, 5 Drawing Sheets

TOUCH SENSOR USING OPTICAL FIBER

BACKGROUND OF THE INVENTION

1. Field of the Invention

The present invention relates to a touch sensor using optical fibers.

2. Description of Related Art

Japanese Kohyo (PCT) Patent Publication No. 2002-507279 discloses a touch sensor in which many pairs of optical fibers are disposed in an elastic member such as urethane foam. In the touch sensor, two optical fibers, that is, a light-emitting optical fiber and a light-receiving optical fiber, are disposed at each pressure sensing point. The front ends of the light-emitting and light-receiving optical fibers are close to each other in the vicinity of the pressure sensing point. In the touch sensor, when a portion of the elastic member corresponding to a pressure sensing point is bent due to a force externally applied, the luminance of the light being emitted from the front end of the light-emitting optical fiber changes in accordance with the magnitude of the force. By using this characteristic, the force applied to the pressure sensing point is detected. In a similar touch sensor, a single optical fiber is disposed at each pressure sensing point. In the touch sensor, the single optical fiber serves as both of light-emitting and light-receiving optical fibers. A beam splitter is used to separate the direction of the incident light and the direction of the reflected light at an end of each optical fiber.

In the touch sensor in which a single optical fiber is disposed at each pressure sensing point, the manufacturing cost can be reduced because the number of optical fibers required is small. In addition, there is no need of setting light-emitting and light-receiving optical fibers at each pressure sensing point such that their front ends are close to each other. This simplifies the manufacturing process and improves the sensor accuracy. In the touch sensor, however, the use of the beam splitter brings about an increase in the manufacturing cost and a complicated sensor construction.

SUMMARY OF THE INVENTION

An object of the present invention is to provide a touch sensor using optical fibers, capable of simplifying the sensor construction and realizing a highly concentrated arrangement of the optical fibers.

According to the present invention, a touch sensor using optical fibers, comprises an elastic member having thereon a plurality of pressure sensing points; and a plurality of optical fibers one ends of which are disposed at positions in the elastic member corresponding to the respective pressure sensing points. Each optical fiber comprises a core and a clad surrounding the core. The sensor further comprises a light source that emits lights toward the other ends of the plurality of optical fibers; a transmissive body having substantially the same refractive index as the core and containing therein the other ends of the optical fibers and the light source; an image-taking device that takes an image showing a change in luminance at the other ends of the plurality of optical fibers; an antireflection member that prevents light reflection into the transmissive body at an end face of the transmissive body; a light-shielding member that prevents incidence of external lights at an end face of the transmissive body; and a force detecting system that detects a force applied to the elastic member, on the basis of the change in luminance at the other ends of the optical fibers shown in the image taken by the image-taking device.

According to the invention, a single optical fiber is disposed at each pressure sensing point. In addition, no beam splitter is required. Thus, the construction of the sensor can be more simplified. Further, because the image-taking device takes an image showing a change in luminance at the other ends of the optical fibers, a highly concentrated arrangement of the optical fibers 13 become possible.

In the sensor of the present invention, the arrangement pattern of the other ends of the plurality of optical fibers may be similar to the arrangement pattern of the plurality of pressure sensing points on the elastic member.

According to the above aspect of the present invention, the arrangement pattern of the other ends of the plurality of optical fibers is similar to the arrangement pattern of the plurality of pressure sensing points on the elastic member. Thus, the image taken by the image-taking device directly shows the pressure distribution on the elastic member. This makes a troublesome work, such as correction processing by a computer software program, unnecessary.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
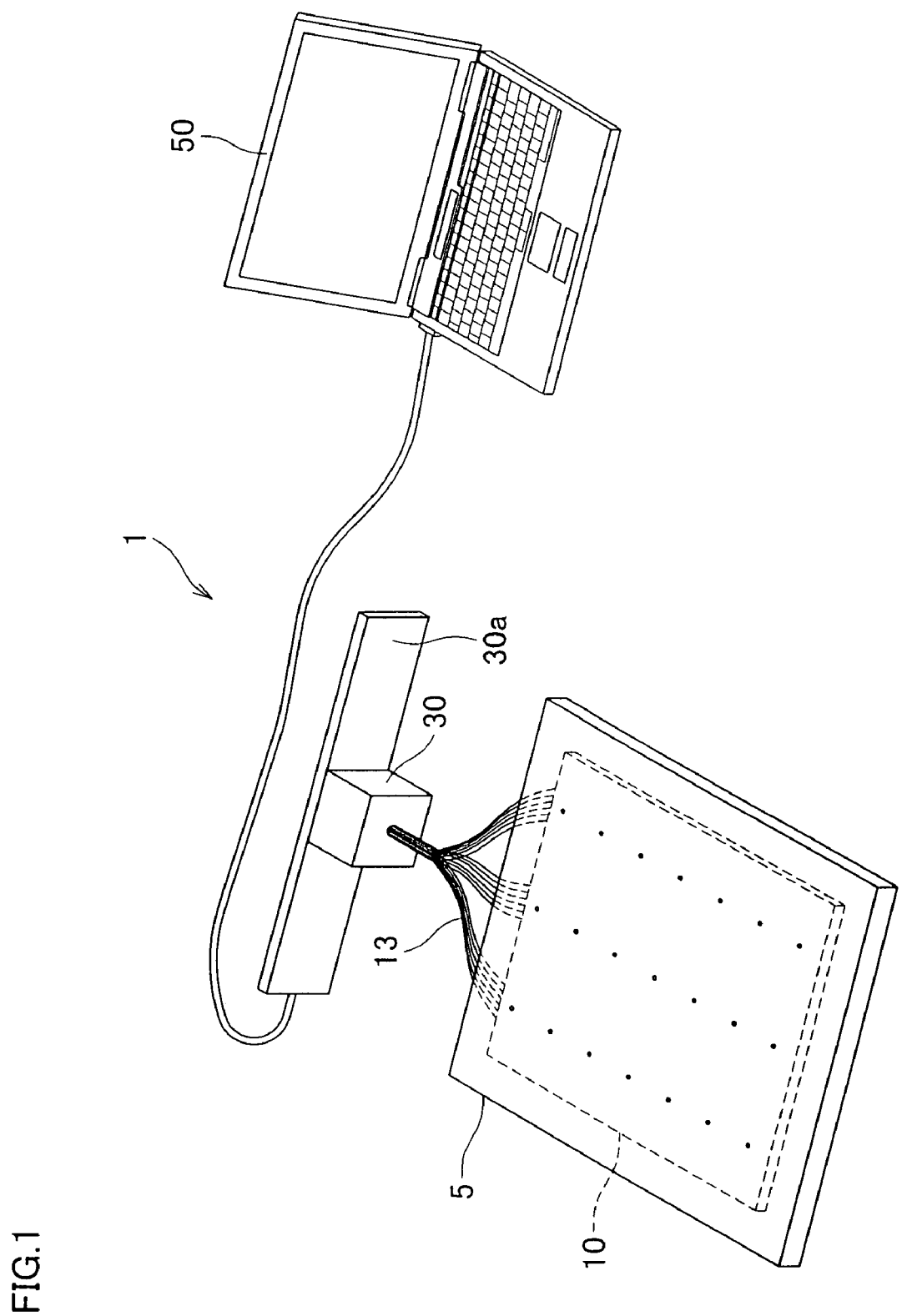
FIG. 1 shows a general construction of a touch sensor using optical fibers, according to an embodiment of the present invention.
Figure 2:
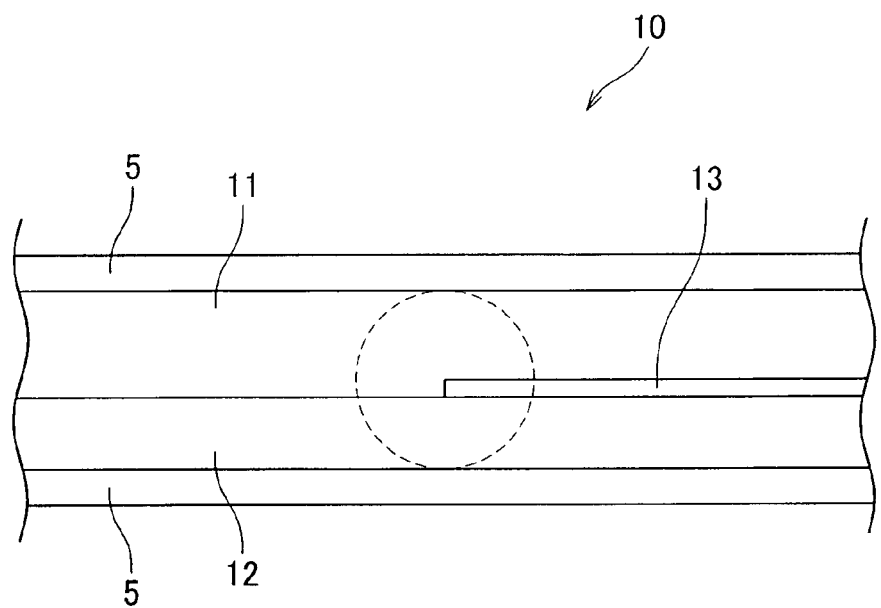
FIG. 2 is a sectional view showing a construction of the interior of a sensor sheet.

Hereinafter, a preferred embodiment of the present invention will be described with reference to the accompanying drawings. FIG. 1 shows a general construction of a touch sensor using optical fibers, according to an embodiment of the present invention. FIG. 2 is a sectional view showing a construction of the interior of a sensor sheet.

The touch sensor shown in FIG. 1 includes a sensor sheet 10 contained in a light-resistant cover 5; and an electronic circuit board 30a on which a detection unit 30 is mounted. A number of optical fibers 13 extended out of the sensor sheet 10 are connected to the detection unit 30. The electronic circuit board 30a is connected to a personal computer 50 that calculates a pressure distribution on the sensor sheet 10 on the basis of the result of detection in the detection unit 30. On a face of the sensor sheet 10, a number of pressure sensing points, each of which is represented by a circle in FIG. 1, are arranged substantially in a matrix. In the touch sensor 1, a single optical fiber 13 is disposed at each pressure sensing point of the sensor sheet 10.

As shown in FIG. 2, the sensor sheet 10 is made up of an upper layer 11 and a lower layer 12, each of which is made of a light-scattering material such as urethane foam. A number of optical fibers 13 are interposed between the upper and lower layers 11 and 12 of the sensor sheet 10. Each optical fiber 13 is made of plastic, and made up of a core and a clad surrounding the core. FIG. 2 shows only one optical fiber 13.

Figure 3A:
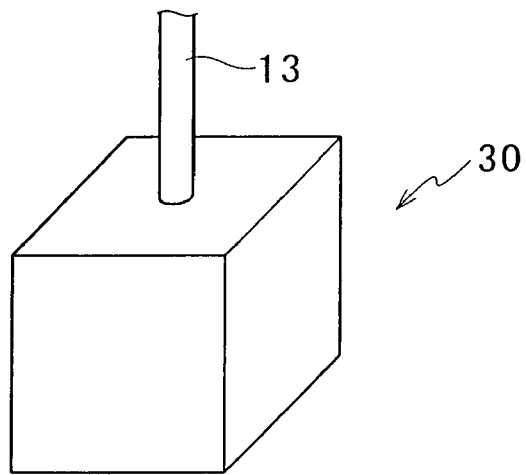
FIG. 3A is an external perspective view of a detection unit.
Figure 3B:
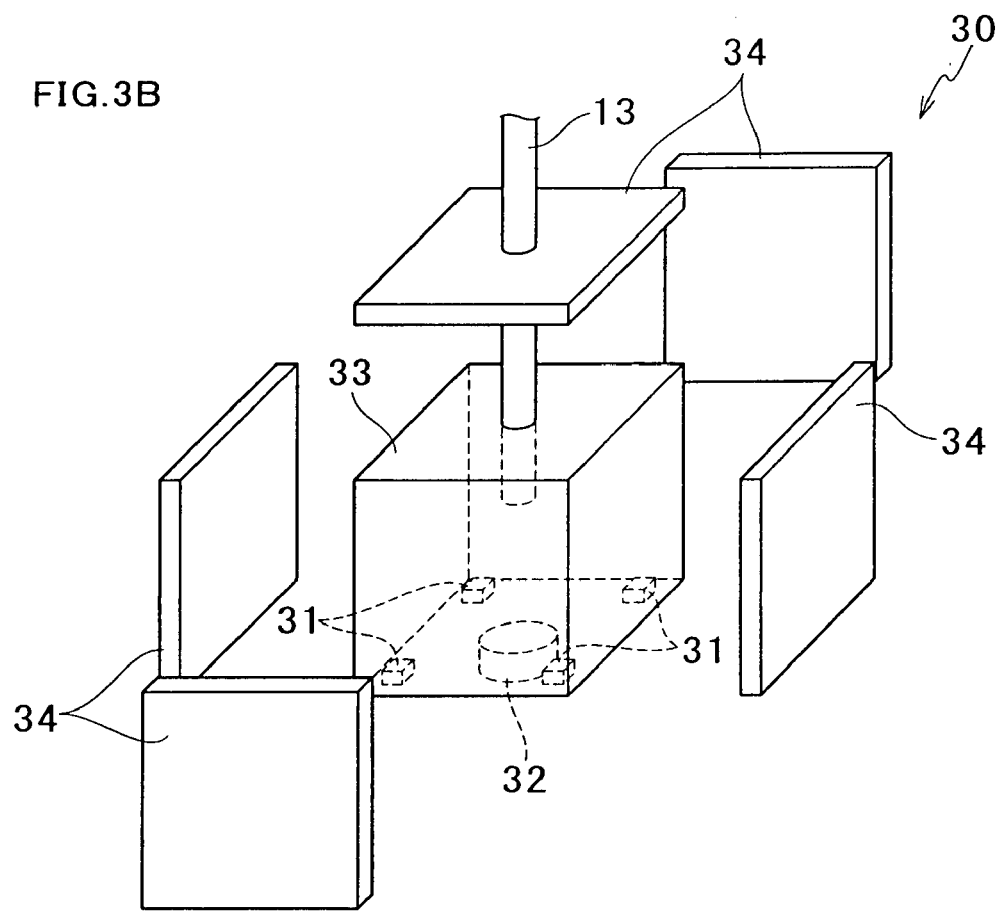
FIG. 3B is an exploded perspective view of the detection unit.

Next, a construction of the detection unit 30 will be described with reference to FIGS. 3A and 3B. FIG. 3A is an external perspective view of the detection unit. FIG. 3B is an exploded perspective view of the detection unit.

As shown in FIG. 3A, the detection unit 30 to which a bundle of optical fibers 13 is connected has a substantially cubic shape. As shown in FIG. 3B, the detection unit 30 includes four light sources 31 each of which emits a light toward the other ends of the bundled optical fibers 13; a camera 32 that takes an image showing a change in luminance at the other ends of the optical fibers 13; a cubic-shaped transmissive body 33 contained therein the other ends of the optical fibers 13 and the light sources 31; and antireflection members 34 disposed on the respective upper and side faces of the transmissive body 33. FIG. 3B shows a state wherein each antireflection member 34 is separated from the corresponding face of the transmissive body 33 though it is really disposed on the face of the transmissive body 33.

For each light source 31 used is, for example, a light-emitting diode. In a modification, however, any other light source such as a laser light source may be used that can supply a light into the sensor sheet 10 through the optical fibers 13. The camera 32 is disposed at a position close to the lower face of the transmissive body 33 so as to be opposed to the other ends of the optical fibers 13.

The transmissive body 33 has substantially the same refractive index as the core of each optical fiber 13. If the transmissive body 33 has its refractive index different from that of the core of each optical fiber 13, a light emitted from each light source 31 is reflected by the other end of an optical fiber 13, and the reflected light may be caught by the camera 32. As a result, a change in luminance at the other ends of the optical fibers 13 can not accurately be detected. This embodiment can avoid such a problem.

Each antireflection member 34 prevents light reflection at the corresponding end face of the transmissive body 33 to the interior of the transmissive body 33. This prevents diffuse reflection of lights in the transmissive body 33. But, the lower face of the transmissive body 33 where the camera 32 is disposed, need not be covered with such an antireflection member 34. Each antireflection member 34 can also prevent incidence of external lights at the corresponding end face of the transmissive body 33. The lower face of the transmissive body 33 where the camera 32 is disposed, may be covered with not a light shielding member but a member that prevents only reflection. Each antireflection member 34 may also serve as a light shielding member that prevents incidence of external lights. Alternatively, a light shielding member provided separately from the antireflection member may be disposed at each end face of the transmissive body 33.

In the touch sensor 1 constructed as described above, lights emitted from each light source 31 enter each optical fiber 13 from its other end, and then exit into the sensor sheet 10 from one end of the optical fiber 13 disposed at a position corresponding to each pressure sensing point. The lights are scattered in the sensor sheet 10, and part of the lights again enters each optical fiber 13 from its one end. The camera 32 takes an image showing a change in luminance at the other end of each optical fiber 13. On the basis of the changes in the luminance, a pressure distribution on the sensor sheet 10 is detected.

Figure 4:
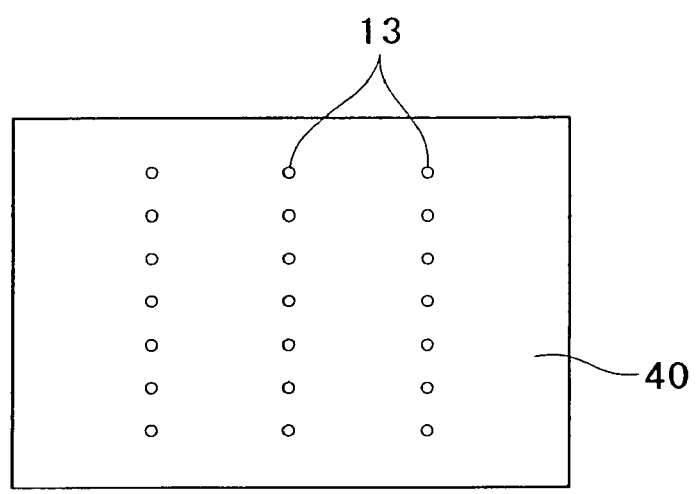
FIG. 4 shows an arrangement pattern of the other ends of a number of optical fibers.

In this embodiment, the arrangement pattern of the other ends of the optical fibers 13 is similar to the arrangement pattern of the pressure sensing points on the sensor sheet 10, as shown in FIG. 4. FIG. 4 shows the other ends of the bundled optical fibers 13 when viewed from the lower face of the transmissive body 33 of FIG. 3B. The other ends of the optical fibers 13 are fixed by a fixing member 40 in a form that the arrangement pattern of the pressure sensing points on the sensor sheet 10 has been scaled down without any change in shape. In this embodiment, the fixing member 40 is made of, for example, epoxy resin or rubber. In a modification, however, any other material may be used that can fix the optical fibers 13.

As described above, in the touch sensor 1 using optical fibers, of this embodiment, a single optical fiber is disposed at each pressure sensing point. In addition, no beam splitter is required. Thus, the construction of the sensor can be more simplified. Further, because the camera 31 takes an image showing a change in luminance at the other ends of the optical fibers 13, a highly concentrated arrangement of the optical fibers 13 become possible.

Further, the arrangement pattern of the other ends of the optical fibers 13 is similar to the arrangement pattern of the pressure sensing points on the sensor sheet 10. Thus, the image taken by the camera 31 directly shows the pressure distribution on the sensor sheet 10. This makes a troublesome work, such as correction processing by a computer software program, unnecessary.

Figure 5A:
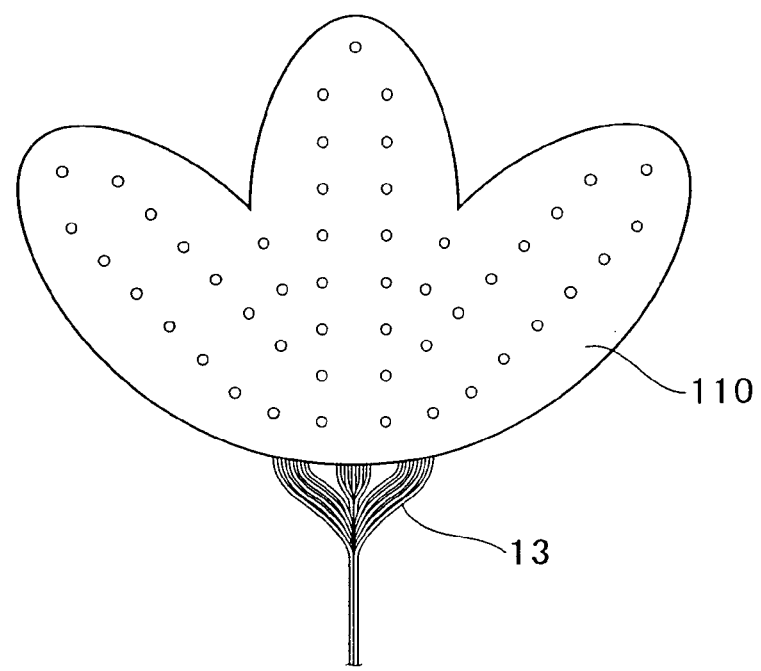
FIG. 5A shows a modification of an arrangement patterns of a number of pressure sensing points.
Figure 5B:
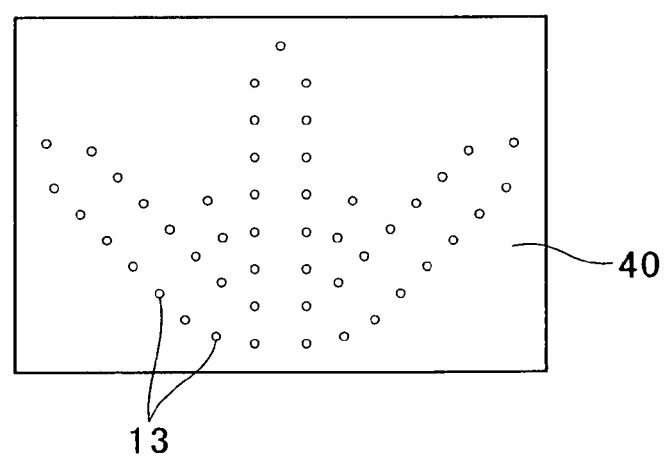
FIG. 5B shows an arrangement pattern of the other ends of a number of optical fibers of the modification.

In the above-described embodiment, a number of pressure sensing points are arranged on the sensor sheet 10, for example, substantially in a matrix. However, the arrangement of the pressure sensing points can be modified. For example, a number of pressure sensing points may be arranged on a sensor sheet 110 in a pattern as shown in FIG. 5A. In this case, the arrangement pattern of the other ends of a number of optical fibers 13 is preferably similar to the arrangement pattern of the pressure sensing points on the sensor sheet 110, as shown in FIG. 5B.

In a modification, the arrangement pattern of the other ends of a number of optical fibers 14 may differ from the arrangement pattern of a number of pressure sensing points on a sensor sheet. For example, a number of optical fibers 13 may be bundled in any form. In this case, however, the positions of the other ends of the optical fibers 13 in the image taken by the camera do not correspond to the positions of the respective pressure sensing points on the sensor sheet. Therefore, in fabricating the sensor, there is required a work of making the positions of the other ends of the optical fibers 13 in images taken by the camera, correspond to the positions of the respective pressure sensing points on the sensor sheet. This work can be implemented by the following method. For example, using a robot, the pressure sensing points on the sensor sheet are pressed in sequence. In the image taken by the camera at each time, the other end of an optical fiber at which the luminance has increased, is related to the position of the pressed pressure sensing point. This relation information is recorded in a processor or the like.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A touch sensor using optical fibers, the sensor comprising:
    an elastic member having thereon a plurality of pressure sensing points;
    a plurality of optical fibers one ends of which are disposed at positions in the elastic member corresponding to the respective pressure sensing points, each optical fiber comprising a core and a clad surrounding the core;
    a light source that emits lights toward the other ends of the plurality of optical fibers;

a transmissive body having substantially the same refractive index as the core and containing therein the other ends of the optical fibers and the light source;

an image-taking device that takes an image showing a change in luminance at the other ends of the plurality of optical fibers;

an antireflection member that prevents light reflection into the transmissive body at an end face of the transmissive body;

a light-shielding member that prevents incidence of external lights at an end face of the transmissive body; and a force detecting system that detects a force applied to the elastic member, on the basis of the change in luminance at the other ends of the optical fibers shown in the image taken by the image-taking device.

2. The sensor according to claim 1, wherein the arrangement pattern of the other ends of the plurality of optical fibers is similar to the arrangement pattern of the plurality of pressure sensing points on the elastic member.

* * * * *